United States Patent
Matsumoto et al.

(10) Patent No.: US 9,636,977 B2
(45) Date of Patent: May 2, 2017

(54) REAR VEHICLE-BODY STRUCTURE OF VEHICLE

(71) Applicant: MAZDA MOTOR CORPORATION, Hiroshima (JP)

(72) Inventors: Kouichi Matsumoto, Hiroshima (JP); Takashi Senoo, Hiroshima (JP); Masaki Oda, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 14/831,215

(22) Filed: Aug. 20, 2015

(65) Prior Publication Data

US 2016/0089966 A1    Mar. 31, 2016

(30) Foreign Application Priority Data

Sep. 26, 2014  (JP) .................................. 2014-197051
Sep. 26, 2014  (JP) .................................. 2014-197053
Sep. 26, 2014  (JP) .................................. 2014-197054

(51) Int. Cl.
  *B60J 1/18*    (2006.01)
  *B60J 7/20*    (2006.01)
  *B60J 7/14*    (2006.01)

(52) U.S. Cl.
  CPC ............. *B60J 1/1823* (2013.01); *B60J 7/146* (2013.01); *B60J 7/202* (2013.01)

(58) Field of Classification Search
  CPC ...... B60J 1/1807; B60J 1/1823; B60J 1/1892; B60J 7/143; B60J 7/146; B60J 7/20; B60J 7/202; B60J 10/90; B60J 7/12; B60J 7/1239; B60J 7/1265; B60J 7/14
  See application file for complete search history.

(56) References Cited

U.S. PATENT DOCUMENTS 2,762,648 A * 9/1956 Huzzard ................ B60J 1/1823
                                                296/117
3,236,557 A * 2/1966 Podolan ................ B60J 1/1823
                                                296/107.07

(Continued)

FOREIGN PATENT DOCUMENTS

DE     FR 1559933 A  *  3/1969   ............ B60J 1/1823
DE       19926474 A1 * 12/2000   ................ B60J 7/20

(Continued)

*Primary Examiner* — Glenn Dayoan
*Assistant Examiner* — Paul Chenevert
(74) *Attorney, Agent, or Firm* — Studebaker & Brackett PC

(57) ABSTRACT

There are provided an openable roof capable of covering over a passenger cabin, a back window provided in back of the openable roof to be apart from a rear end of the openable roof which is in a state in which the openable roof covers over the passenger cabin, a link mechanism connecting the openable roof and the back window to a vehicle body such that the openable roof and the back window swing relative to the vehicle body, a storage room provided in back of the passenger cabin to store the openable roof and the back window, and a shielding member to shield a gap between the openable roof and the back window which are in a state in which the openable roof and the back window cover over the passenger cabin. This shielding member is provided not to be storable in the storage room.

13 Claims, 14 Drawing Sheets

(56) References Cited

U.S. PATENT DOCUMENTS

| | | | | |
|---|---|---|---|---|
| 3,332,169 | A * | 7/1967 | Lohr | B60J 1/1823 296/145 |
| 4,626,020 | A * | 12/1986 | Kaltz | B60J 1/1823 296/107.07 |
| 5,584,522 | A * | 12/1996 | Kerner | B60J 7/145 296/108 |
| 6,685,252 | B2 * | 2/2004 | Graf | B60J 10/25 296/108 |
| 7,401,839 | B2 * | 7/2008 | Hiyama | B60J 7/145 296/108 |
| 7,740,302 | B2 * | 6/2010 | Heselhaus | B60J 7/20 296/107.01 |
| 7,832,784 | B2 * | 11/2010 | Cimatti | B60J 1/183 296/107.09 |
| 7,896,423 | B2 * | 3/2011 | Wiechowski | B60J 1/1823 296/107.17 |
| 7,922,232 | B2 * | 4/2011 | Heselhaus | B60J 1/183 296/107.08 |
| 7,950,718 | B2 * | 5/2011 | Neubrand | B60J 7/20 296/107.07 |
| 8,287,029 | B2 * | 10/2012 | Fallis, III | B60J 7/146 296/107.08 |
| 8,567,845 | B2 * | 10/2013 | Ugolini | B60J 7/146 296/107.17 |
| 9,186,969 | B2 * | 11/2015 | Ugolini | B60J 7/146 |
| 9,452,665 | B2 * | 9/2016 | Schulzki | B60J 7/08 |
| 2016/0089965 | A1 * | 3/2016 | Matsumoto | B60J 7/202 296/37.5 |

FOREIGN PATENT DOCUMENTS

| | | | | |
|---|---|---|---|---|
| DE | 19948666 A1 * | 4/2001 | | B60J 1/183 |
| DE | 10321342 B3 * | 4/2004 | | B60J 1/183 |
| DE | 10345123 A1 * | 6/2005 | | B60R 21/13 |
| DE | 102005002935 A1 * | 7/2006 | | B60J 7/028 |
| DE | WO 2008052727 A1 * | 5/2008 | | B60J 1/183 |
| DE | WO 2008061578 A1 * | 5/2008 | | B60J 1/183 |
| DE | 102008014699 A1 * | 12/2009 | | B60J 7/146 |
| DE | 102008056375 A1 * | 5/2010 | | B60J 7/146 |
| DE | 102011119501 A1 * | 5/2013 | | B60J 7/08 |
| FI | EP 2610096 A2 * | 7/2013 | | B60J 7/1234 |
| FR | EP 0882611 A1 * | 12/1998 | | B60J 7/08 |
| FR | 2856347 A1 * | 12/2004 | | B60J 1/1823 |
| FR | WO 2006045908 A1 * | 5/2006 | | B60J 1/1823 |
| FR | 2885325 A1 * | 11/2006 | | B60J 7/145 |
| FR | 2891235 A1 * | 3/2007 | | B60J 7/20 |
| FR | 2915142 A1 * | 10/2008 | | B60J 7/0084 |
| JP | EP 454279 A2 * | 10/1991 | | B60J 7/08 |
| JP | 2007-261412 A | 10/2007 | | |
| WO | 2005/061253 A1 | 7/2005 | | |

\* cited by examiner

REAR VEHICLE-BODY STRUCTURE OF VEHICLE

BACKGROUND OF THE INVENTION

The present invention relates to a rear vehicle-body structure of a so-called open car provided with an openable roof.

Vehicles with an openable roof (convertible type open car) have been developed, and an example of those vehicles is disclosed in Japanese Patent Laid-Open Publication No. 2007-261412.

As shown in FIGS. 15 and 16, a vehicle 100 disclosed in the above-described patent document comprises a front roof panel 101, a middle roof pane 102, a back window 103, and a deck lid 104. The front roof panel 101, the middle roof panel 102, and the back window 103 (hereafter, referred to as "the front roof panel 101 and the like") are connected to each other by a link mechanism, not illustrated, (hereafter, referred to as "the first link mechanism") and also connected to a vehicle body. The front roof panel 101 and the like are changeable between a use position in which it covers over a passenger cabin 105 and a storage position in which it is stored in a storage room 106 so as to open the passenger cabin 105 by an operation of the first link mechanism. In the use position, as shown in FIG. 15, a rear-side edge of the front roof panel 101 is continuous to a front end of the middle roof panel 102, and a front-side edge portion of the back window 103 is continuous to a rear-side edge portion of the middle roof panel 102.

The deck lid 104 is connected to the vehicle body by another link mechanism, not illustrated, (hereafter, referred to as the "second link mechanism") which is different from the first link mechanism. The deck lid 104 is changeable between a normal position in which it covers a portion of an upper-end opening of the storage room 106 (see FIGS. 15 and 16) and a retreat position in which it retreats obliquely rearward and upward relative to the normal position so as to open the upper-end opening of the storage room 106 (see two-dotted broken lines in FIG. 15) by an operation of the second link mechanism.

Herein, behaviors of the front roof panel 101 and the like and the deck lid 104 when the front panel 101 and the like are changed from the state of covering over the passenger cabin 105 to the state of opening the passenger cabin 105 will be described.

The deck lid 104 is moved, by the operation of the second link mechanism, from the normal position shown by a solid line in FIG. 15 to the retreat position shown by the two-dotted broken line, so that the upper-end opening of the storage room 106 is opened. At the same time, the front roof panel 101 and the like are moved rearward, changing their positions, by the operation of the first link mechanism.

The front roof panel 101 and the like are stored in the storage room 106 in an overlapping state in which they are overlapped in a vertical direction as the first link mechanism further operates as shown by the two-dotted broken line in FIG. 16.

After the front roof panel 101 and the like are stored in the storage room 106, the deck lid 104 is moved from the retreat position to the normal position in which it covers the portion of the storage room 106 by the second link mechanism. Thereby, the passenger cabin 105 has its open state.

As described above, according to the vehicle 100 disclosed in the above-described patent document, the front roof panel 101 and the like (the front roof panel 101, the middle roof panel 102, and the back window 103) can be stored in the storage room 106 together by moving the deck lid 104 to the retreat position.

However, since the front roof panel 101, the middle roof panel 102, and the back window 103 are all moved at the same time and stored in the storage room 106 together according to the vehicle 100 disclosed in the above-described patent document, a whole size of these members to be stored becomes so large that an area of a space through which the members to be stored pass when being stored becomes improperly large. Meanwhile, since a size of the storage room 106 and a shape and a size of an opening portion of the storage room 106 are limited in layout, there is a problem that it may be difficult to ensure the flexibility of design of the members to be stored. Further, since a whole weight of the members to be stored becomes so heavy that there is another problem that it may be difficult to improve a moving speed of the members to be stored.

SUMMARY OF THE INVENTION

The present invention has been devised in view of the above-described matters, and an object of the present invention is to provide a rear vehicle-body structure of a vehicle which can make the members, such as the openable roof, which are stored by the operation of the link mechanisms compact as a whole, so that the area of the passing space of the members to be stored and the weight of the members to be stored can be properly small.

The present invention is a rear vehicle-body structure of a vehicle, comprising an openable roof capable of covering over a passenger cabin, a back window provided in back of the openable roof to be apart from a rear end of the openable roof which is in a state in which the openable roof covers over the passenger cabin, a link mechanism connecting the openable roof and the back window to a vehicle body such that the openable roof and the back window swing relative to the vehicle body, a storage room provided in back of the passenger cabin to store the openable roof and the back window, and a shielding member to shield a gap between the openable roof and the back window which are in a state in which the openable roof and the back window cover over the passenger cabin, wherein the above-described shielding member is provided not to be storable in the above-described storage room.

According to the present invention, since the shielding member is not stored in the storage room, the members to be stored in the storage room can be compact as a whole, so that the area of the passing space of the members to be stored and the weight of the members to be stored can be properly small. The compact members to be stored can achieve the small-sized storage room and an increase of the layout flexibility of vehicle components. Further, the small area of the passing space of the members to be stored can prevent the members to be stored from interfering with the opening portion of the storage room or the deck lid which opens or closes the opening portion of the storage room, thereby increasing the design flexibility of the members to be stored. Moreover, the small (light) weight of the members to be stored can cause an increase of the moving speed of the members to be stored, so that opening/closing behavior of the roof can be properly quick, thereby improving the operability of the openable roof by a vehicle user.

In an embodiment of the present invention, the shielding member comprises a rear header which shields a gap between the rear end of the openable roof and an upper end of the back window and a pair of right-and-left rear pillars which extend downward from both end portions, in a vehicle width direction, of the rear header.

According to this embodiment, since it is unnecessary that the storage room is configured to receive (accept) the right-and-left rear pillars, the length, in the vehicle width direction, (i.e., the width) of the storage room can be properly short, and the size, in the vehicle width direction, of the members to be stored can be compact, thereby increasing the layout flexibility of the vehicle components. Further, since the area of the passing space of the members to be stored can be small in the vehicle width direction, it can be properly prevented that the members to be stored interfere with the opening portion of the storage room, thereby further increasing the design flexibility of the members to be stored.

In another embodiment of the present invention, there is provided a deck lid which is swingably supported so as to cover an opening portion of the storage room in a roof closed state in which the openable roof, the shielding member and the back window cover over the passenger cabin and in a roof open state in which the openable roof and the back window are stored in the storage room, and to open the opening portion of the storage room in a transitional state between the roof closed state and the roof open state, and the shielding member is formed as a portion of the deck lid.

According to this embodiment, the deck lid is moved so as to open the opening portion of the storage room when being moved from the roof closed state to the roof open state. Since the shielding member is formed as a portion (part) of the deck lid, it can be prevented that the openable roof and the back window interfere with the shielding member when being moved. Further, since the shielding member swings when the deck lid swings, there is no need to additionally provide any mechanism to make the shielding member swing other than the mechanism to make the deck lid swing.

In another embodiment of the present invention, there is provided a link mechanism for the shielding member which swingably connects the shielding member to the vehicle body, which is configured such that after the shielding member starts retreating to a position where the shielding member does not interfere with the openable roof and the back window by an operation of the link mechanism for the shielding member, the openable roof and the back window move by an operation of the link mechanism.

According to this embodiment, since the openable roof and the back window are moved after the shielding member starts retreating to the position where the shielding member does not interfere with the openable roof and the back window, it can be prevented that the openable roof and the back window interfere with the shielding member, thereby improving the design flexibility of the openable roof, the back window, and the shielding member.

In another embodiment of the present invention, the above-described rear vehicle-body structure further comprises a deck lid provided above the storage room and comprising a base portion and a protrusion portion which is integrally formed with the base portion, protrudes upward relative to the base portion, and extends in a vehicle longitudinal direction, a rear end of the protrusion portion being configured to protrude rearward from a rear end of the base portion, and another link mechanism connecting the deck lid to the vehicle body such that the deck lid swings relative to the vehicle body, wherein the deck lid is configured to cover an opening portion of the storage room in a roof closed state in which the openable roof covers over the passenger cabin and in a roof open state in which at least a portion of the openable roof is stored in the storage room, and to move rearward and upward relative to the opening portion of the storage room in a transitional state between the roof closed state and the roof open state, and the other link mechanism comprises a link lever which connects a bottom portion of the protrusion portion and the vehicle body, the link lever being configured to rotate upward when the deck lid goes up.

According to this embodiment, since the deck lid includes the protrusion portion extending in the vehicle longitudinal direction, the sporty external appearance can be created, thereby providing a rear portion of the vehicle body with a superior design. Further, since the deck lid is movable not only upward but rearward, the roof can be properly stored, avoiding any interference of the roof with the deck lid when the roof is moved from the closed state to the open state, even in case in which the upward move-amount of the deck lid is relatively small. Moreover, since the above-described move of the deck lid is performed by the rotation of the link lever connecting the bottom portion of the protrusion portion and the vehicle body, the structure of the link mechanism can be prevented from being complex. Accordingly, the roof opening/closing mechanism (link mechanism) can be small sized, thereby providing a superior layout of the vehicle components stored in the storage room. Also, since the storage room can be compact, an open space can be created near the storage room, so that the layout flexibility of the vehicle components can be increased.

In another embodiment of the present invention, the other link mechanism supports a position near a front portion of the protrusion portion.

According to this embodiment, the link mechanism can support a position near a gravity center of the protrusion portion in a case in which the protrusion portion is of a triangular shape. Thereby, the deck lid can be made to swing stably.

In another embodiment of the present invention, the protrusion portion is arranged at each end portion, in a vehicle width direction, of the base portion, and the protrusion portion positioned on one end side and the protrusion portion positioned on the other end side are interconnected, in the vehicle width direction, by a member which is different from the base portion at respective positions of the both protrusion portions which are located above respective lower end portions of the both protrusion portions.

According to this embodiment, since the rigidity of the deck lid is increased by connecting the both-side protrusion portions to each other in the vehicle width direction, a twist of the deck lid during the deck lid is moved can be prevented.

In another embodiment of the present invention, the protrusion portion is configured in a triangular shape, when viewed from a vehicle side, such that an upper edge thereof slants rearward and downward.

According to this embodiment, a rear portion of the vehicle body can be provided with a coupe-shaped design (an exterior design of a coupe type vehicle) in both the closed state and the open state of the openable roof. Further, the air resistance of the rear portion of the vehicle body can be reduced.

In another embodiment of the present invention, the above-described rear vehicle-body structure further comprises a deck lid swingably supported so as to cover an opening portion of the storage room in a roof closed state in which the openable roof and the back window cover over the passenger cabin and in a roof open state in which the openable roof and the back window are stored in the storage room, and to open the opening portion of the storage room in a transitional state between the roof closed state and the roof open state, and a seal member provided at the back window or the deck lid to seal a gap between at least part of a peripheral portion of the back window and the deck lid in the roof closed state.

According to this embodiment, since the seal member to seal at least part of the peripheral portion of the back window is provided at the back window or the deck lid, it is unnecessary to provide the seal member to seal the peripheral portion of the back window at a vehicle-body member near a back face of a seat. For example, there is no need to provide any seal member at a guide portion (a perpendicular-side guiding portion) which is arranged near a seat's back face, differently from a deck lid (a lid 103), which is disclosed in International Publication No. WO 2005/061253. Accordingly, the peripheral portion of the back window can be sealed, ensuring the design flexibility of the vehicle body near the seat's back face. Herein, the above-described "vehicle-body member near the back face of the seat" does not include the back window or the deck lid.

In another embodiment of the present invention, the above-described rear vehicle-body structure further comprises a link mechanism for the deck lid to make the deck lid swing, wherein the link mechanism for the deck lid is configured to press the deck lid against the back window in the roof closed state.

According to this embodiment, since the link mechanism for the deck lid presses the deck lid against the back window in the roof closed state, the adhesiveness of the seal member against the back window and the deck lid can be increased, thereby improving the seal efficiency.

In another embodiment of the present invention, in the roof closed state, the deck lid extends to a position above the back window, and the seal member is configured to seal a gap between at least a portion of an upper edge portion of the back window and the deck lid.

According to this embodiment, the gap between at least the portion of the upper edge portion of the back window and the deck lid can be sealed. Thereby, even when a structure in which a rear end of the openable roof does not directly face the upper edge portion of the back window is adopted, the upper edge portion of the back window can be sealed surely.

In another embodiment of the present invention, the seal member is configured to seal a gap between a whole part of the peripheral portion of the back window and the deck lid.

According to this embodiment, the gap between the whole part of the peripheral portion of the back window and the deck lid can be sealed, so that the whole part of the peripheral portion of the back window can be sealed surely.

Other features, aspects, and advantages of the present invention will become apparent from the following description which refers to the accompanying drawings.

DETAILED DESCRIPTION OF THE INVENTION

Hereafter, a preferred embodiment of the present invention will be described specifically referring to the accompanying drawings.

A rear vehicle-body structure 1 of a vehicle according to the embodiment of the present invention will be described referring to FIGS. 1-14. In the following description, a "longitudinal direction" means a longitudinal direction of the vehicle.

The rear vehicle-body structure 1 is the one of an open car provided with an openable roof 2.

Figure 3:
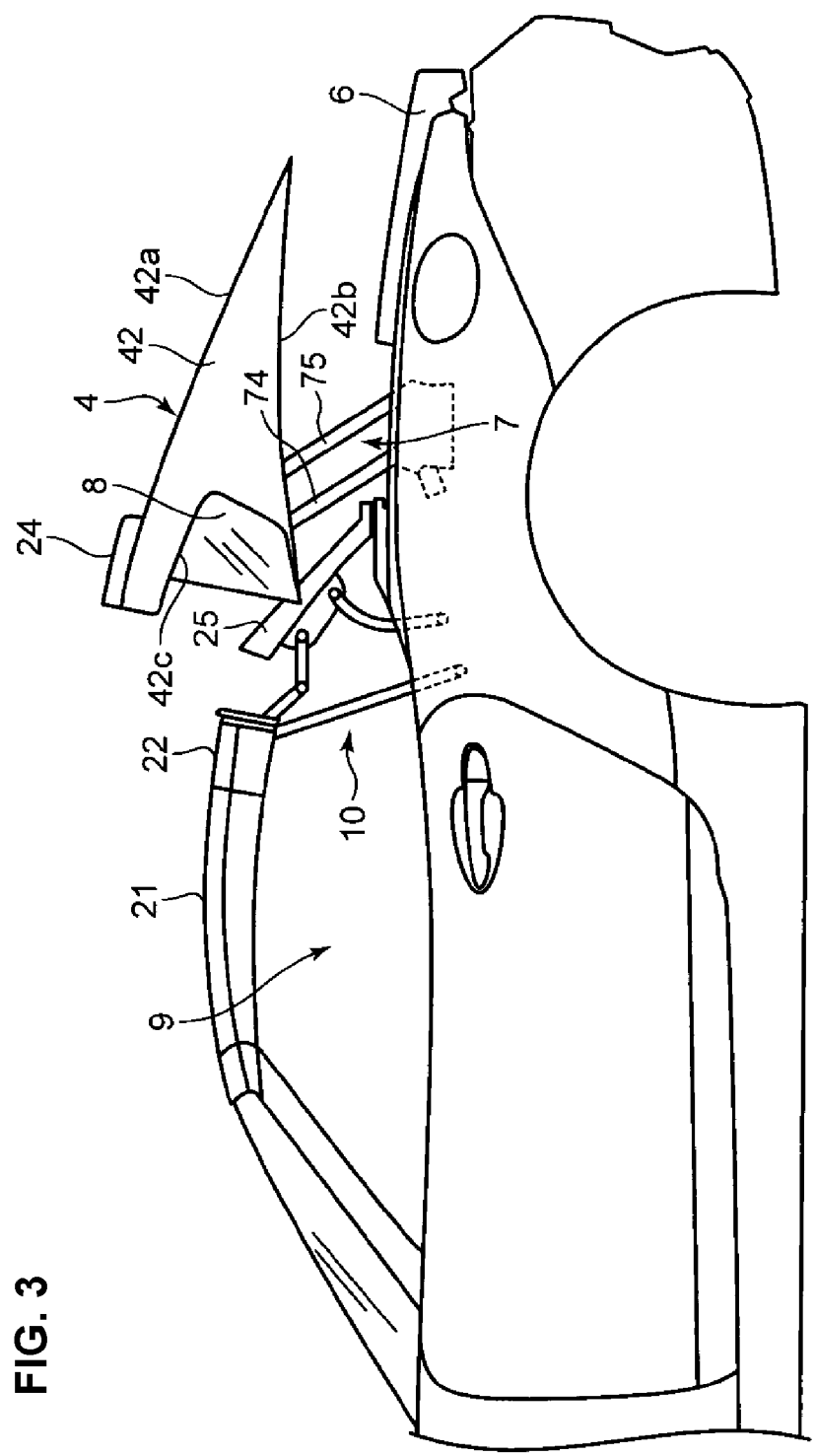
FIG. 3 is a side view showing the rear vehicle-body structure of the vehicle according to the embodiment of the present invention in a transitional state (before a roof is stored) from the state in which the openable roof is closed to a state in which the openable roof is open.
Figure 4:
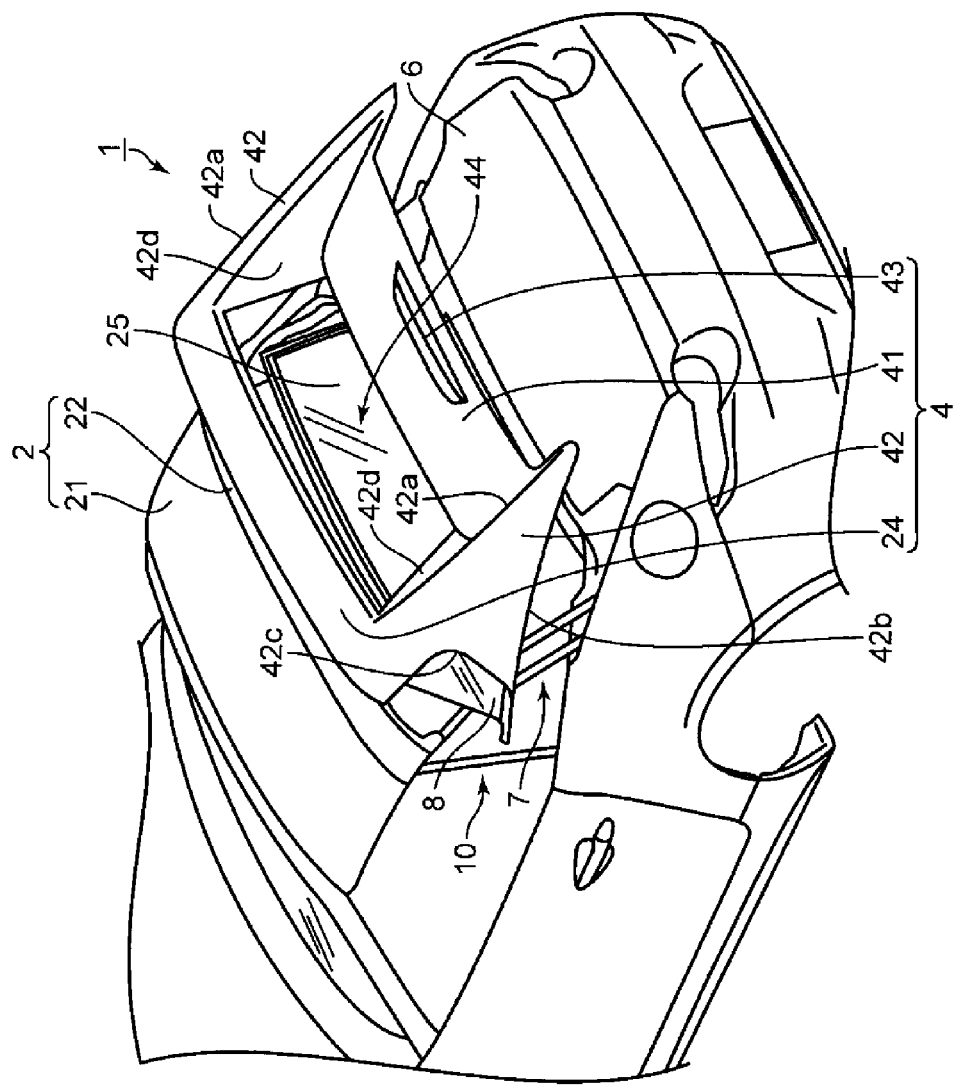
FIG. 4 is a perspective view of the rear vehicle-body structure shown in FIG. 3, when viewed from the oblique-rear side of the vehicle.

The rear vehicle-body structure 1 comprises the openable roof 2, a roof storage room 3 (see FIG. 8), a deck lid 4, a trunk room 5 (see FIG. 8), a trunk lid 6, a first link mechanism 7 (see FIGS. 3-5, 11 and 12), and a second link mechanism 10 (see FIGS. 3 and 4).

Figure 6:
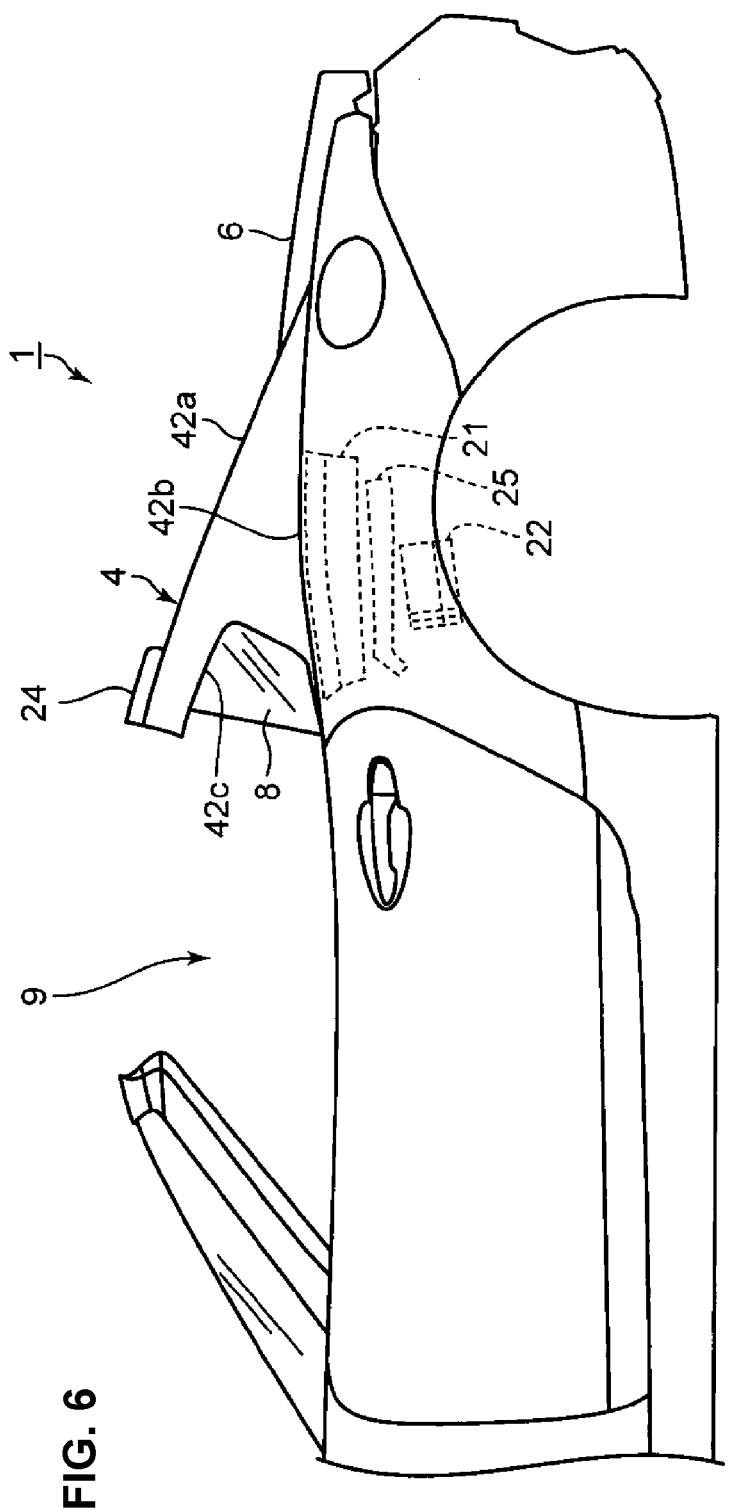
FIG. 6 is a side view showing the rear vehicle-body structure of the vehicle according to the embodiment of the present invention in the state in which the openable roof is open.
Figure 7:
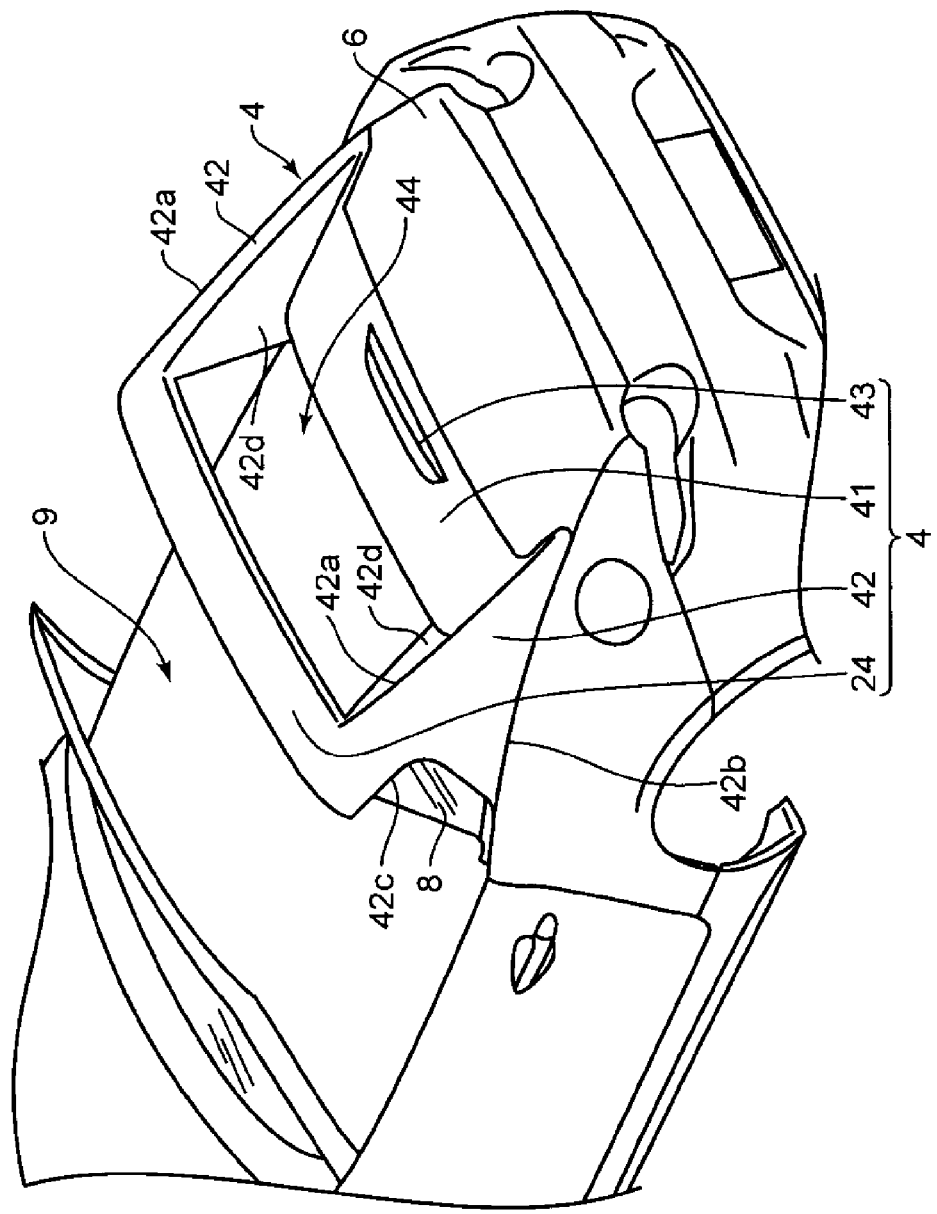
FIG. 7 is a perspective view of the rear vehicle-body structure shown in FIG. 6, when viewed from the oblique-rear side of the vehicle.

The openable roof 2 is supported at a vehicle body such that it is changeable between a roof closed state in which it covers over the passenger cabin 9 (see FIGS. 1 and 2) and a roof open state in which it is stored in the roof storage room 9 so as to open the passenger cabin 9 (see FIGS. 6 and 7).

The openable roof 2 is a hard-top type roof. The openable roof 2 comprises a front roof 21 and a middle roof 22.

The front roof 21 is a roof which covers over the passenger cabin 9. The middle roof 22 is a roof which is provided to be continuous rearward from the front roof 21 in the above-described roof closed state.

In the roof closed state, a plate-shaped rear header 24, which is a structural element of the deck lid 4, is provided to be continuous rearward from the middle roof 22, and a back window 25 (see FIG. 2) which is provided to be continuous below from the rear header 24. That is, the back window 25 is provided to be spaced rearward apart from a rear end of the middle roof 22 in the roof closed state. The rear header 24 shields a gap between the middle roof and the back window 25, and covers over the passenger cabin 9 in the roof closed state.

Figure 1:
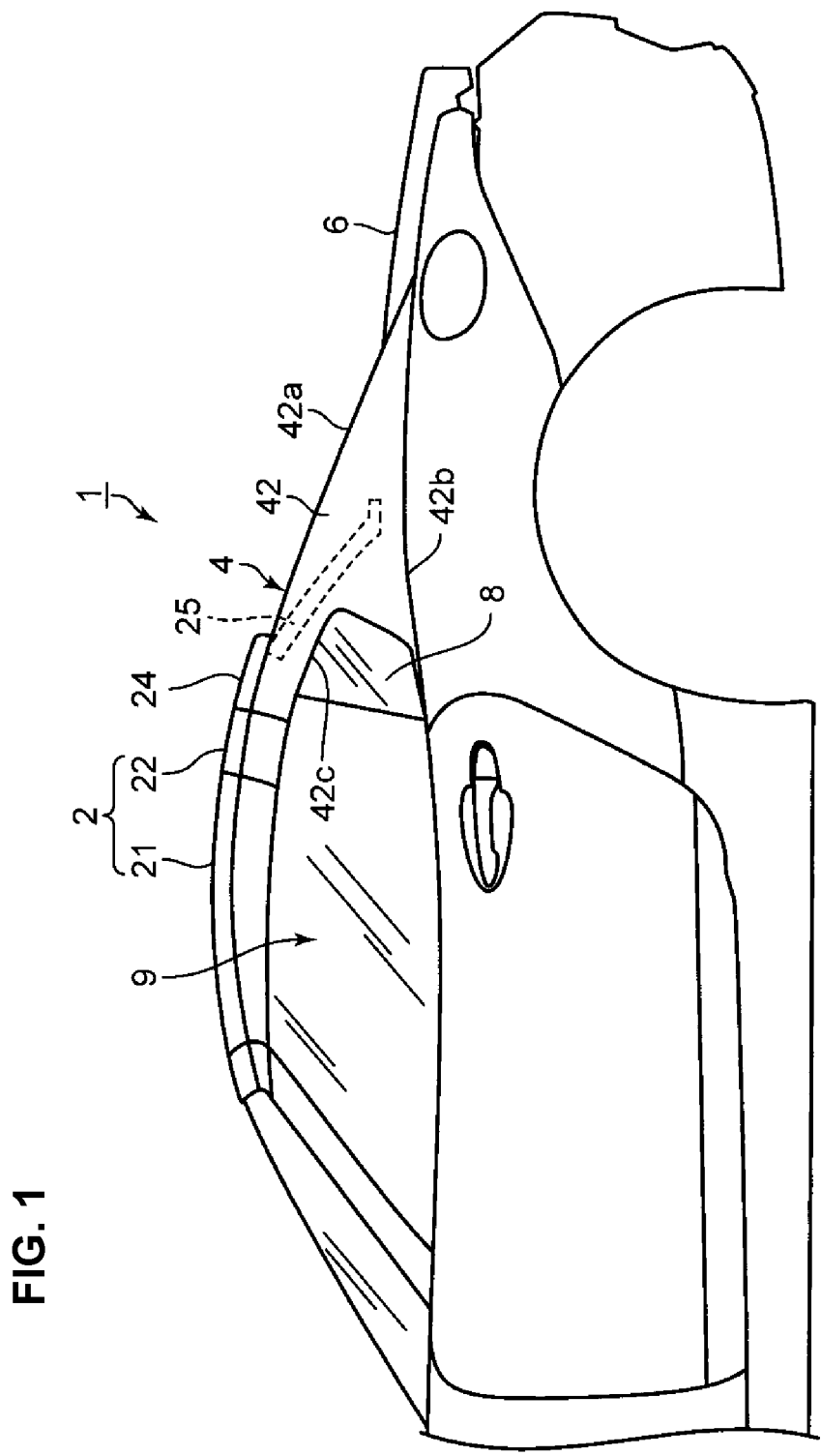
FIG. 1 is a side view showing a rear vehicle-body structure of a vehicle according to an embodiment of the present invention in a state in which an openable roof is closed.
Figure 2:
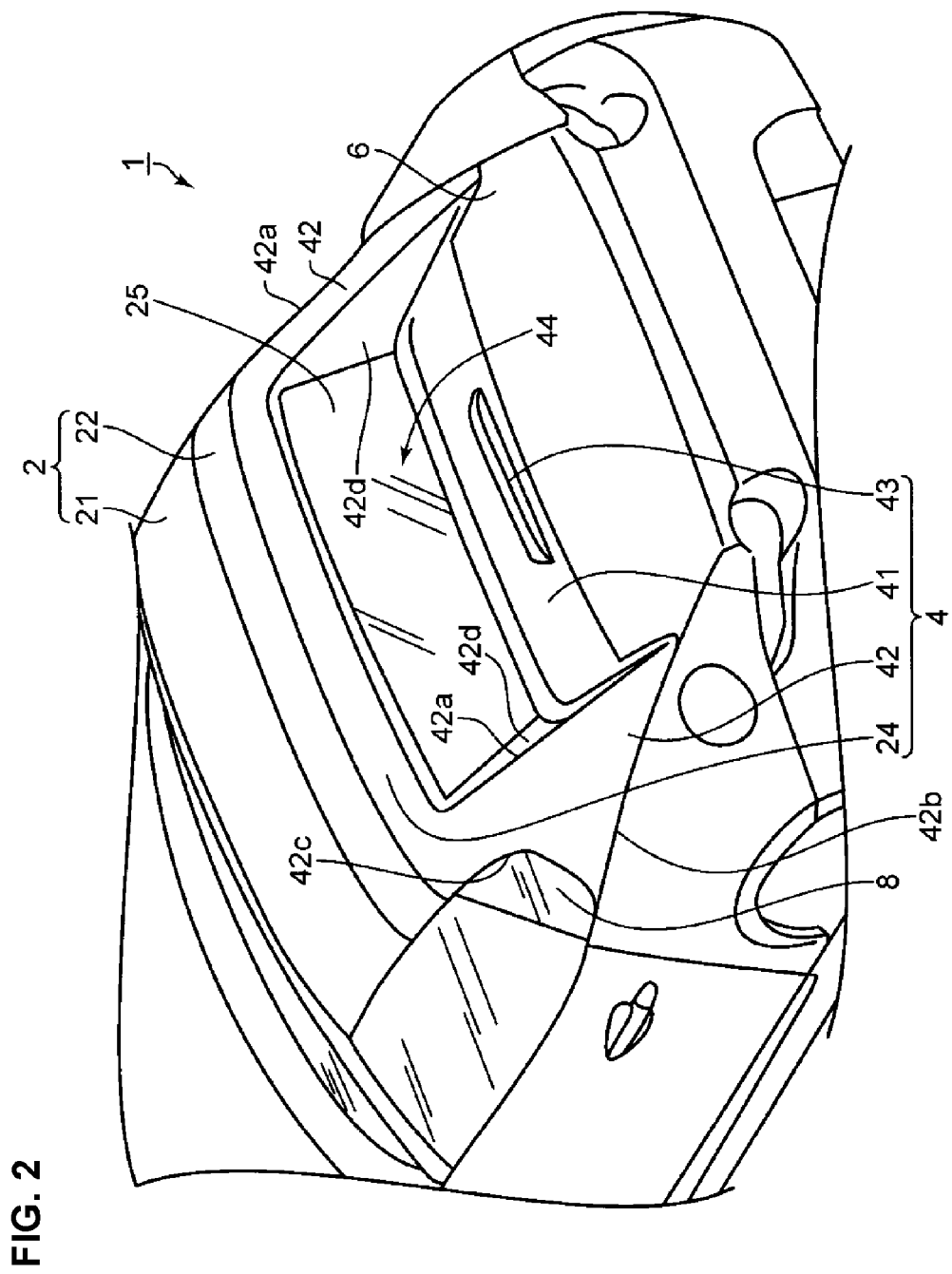
FIG. 2 is a perspective view of the rear vehicle-body structure shown in FIG. 1, when viewed from an oblique-rear side of the vehicle.

The front roof 21, the middle roof 22, the rear header 24, and the back window 25 tightly contact each other via seal members, not illustrated, in the roof closed state (see FIGS. 1 and 2). Meanwhile, the front roof 21, the middle roof 22, the rear header 24, and the back window 25 have a state of being separated from each other in the roof open state (see FIG. 6). The details will be described later.

Figure 11:
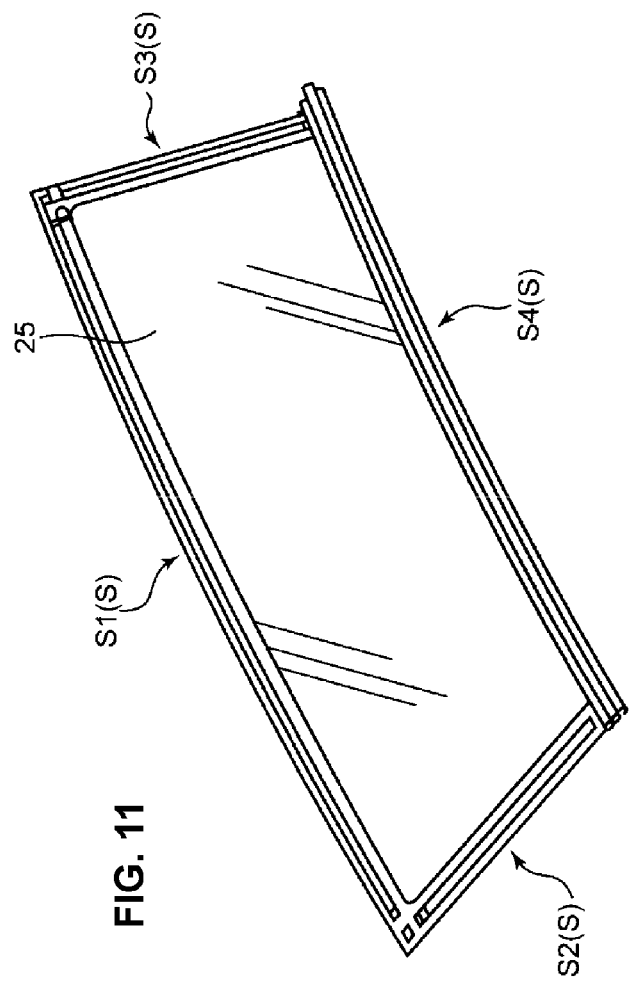
FIG. 11 is a perspective view showing the back window and a seal member which is provided at a peripheral portion of the back window according to the embodiment of the present invention.
Figure 12:
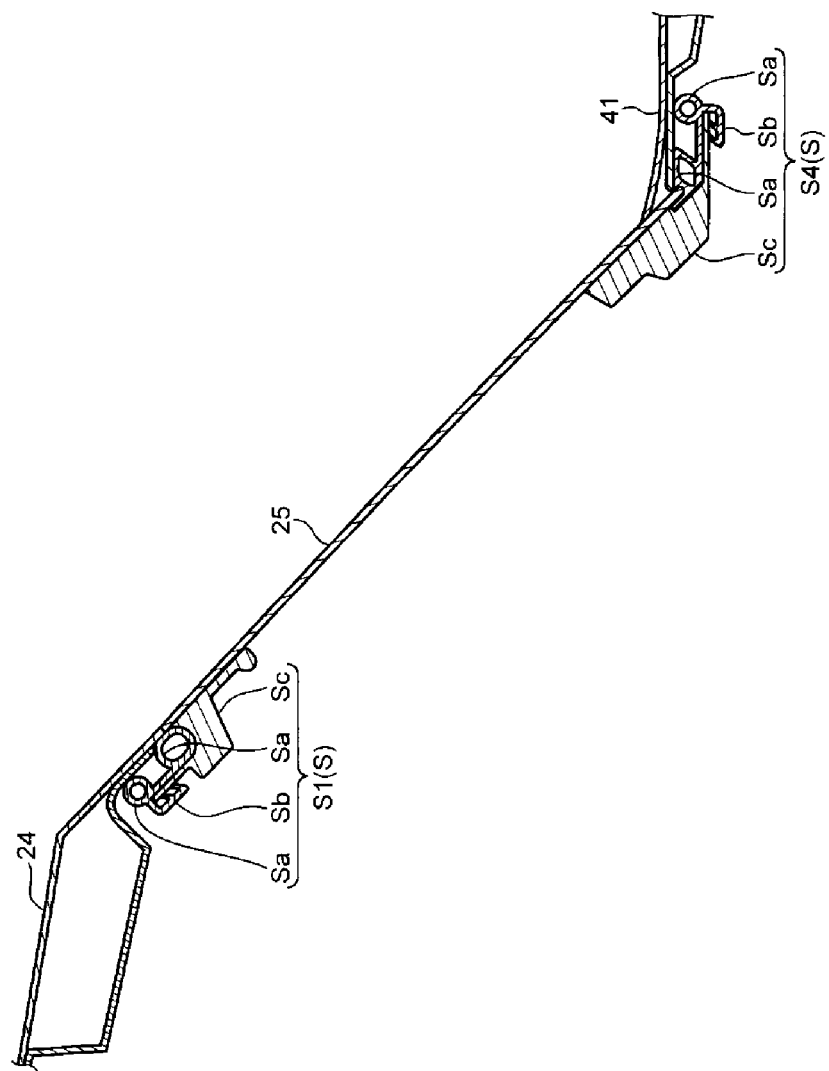
FIG. 12 is a sectional view showing a structure near the back window according to the embodiment of the present invention.

The rear header 24 and the back window 25 tightly contact each other via a seal member S shown in FIGS. 11 and 12 in the roof closed state.

As shown in FIG. 11, the seal member S is attached to a peripheral portion (an upper edge portion, a left edge portion, a right edge portion, and a lower edge portion) of the back window 25, which is formed as a whole in a rectangular frame shape having a longer lateral length in a front view. The seal member S comprises an upper portion S1, a left portion S2, a right portion S3, and a lower portion S4, which are respectively attached to the upper edge portion, the left edge portion, the right edge portion, and the lower edge portion of the back window 25.

The upper portion S1, the left portion S2, the right portion S3, and the lower portion S4 respectively have a contact portion Sa, an engaging portion Sb, and a fixation portion Sc as shown in FIG. 12. The contact portion Sa is a tubal portion having flexibility, which extends along the peripheral portion of the back window 25. The rear header 24 is pressed against the contact portion Sa of the upper portion S1 and the contact portion Sa deforms resiliently, so that a gap between the back window 25 and the rear header 24 is sealed, thereby preventing rain water from coming in (see FIG. 12). Further, a base portion 41, which will be described later, is pressed against the contact portion Sa of the lower portion S4 and this contact portion Sa deforms resiliently, so that a gap between the back window 25 and the base portion 41 is sealed (see FIG. 12). Moreover, inside walls 42d in the vehicle width direction (see FIG. 2), which will be described later, are pressed against the contact portions Sa of the left portion S2 and the right portion S3 and these contact portions Sa deform resiliently, so that gaps between the back window 25 and the inside walls 42d are sealed (see FIG. 12).

The front roof 21, the middle roof 22, the rear header 24, and the back window 25 have the state in which they are separated from each other in the roof open state (see FIG. 6).

In this separate state, the contact state of the rear header 24, the base portion 41, and the inside walls 42d with the seal member S is released.

The front roof 21, the middle roof 22, and the back window 25 are connected to each other by the second link mechanism 10, and connected to the vehicle body by the second link mechanism 10. The rear header 24 is not coupled to the second link mechanism 10.

The roof storage room 3 (see FIG. 8) is provided between the passenger cabin 9 and the trunk room 5 which is provided behind the passenger cabin 9. The roof storage room 3 is a partition to store the openable roof 2 (the front roof 21 and the middle roof 22) and the back window 25. The front roof 21, the middle roof 22, and the back window 25 are stored in a state in which they are overlapped in a vertical direction as shown by broken lines in FIGS. 5 and 6.

Figure 8:
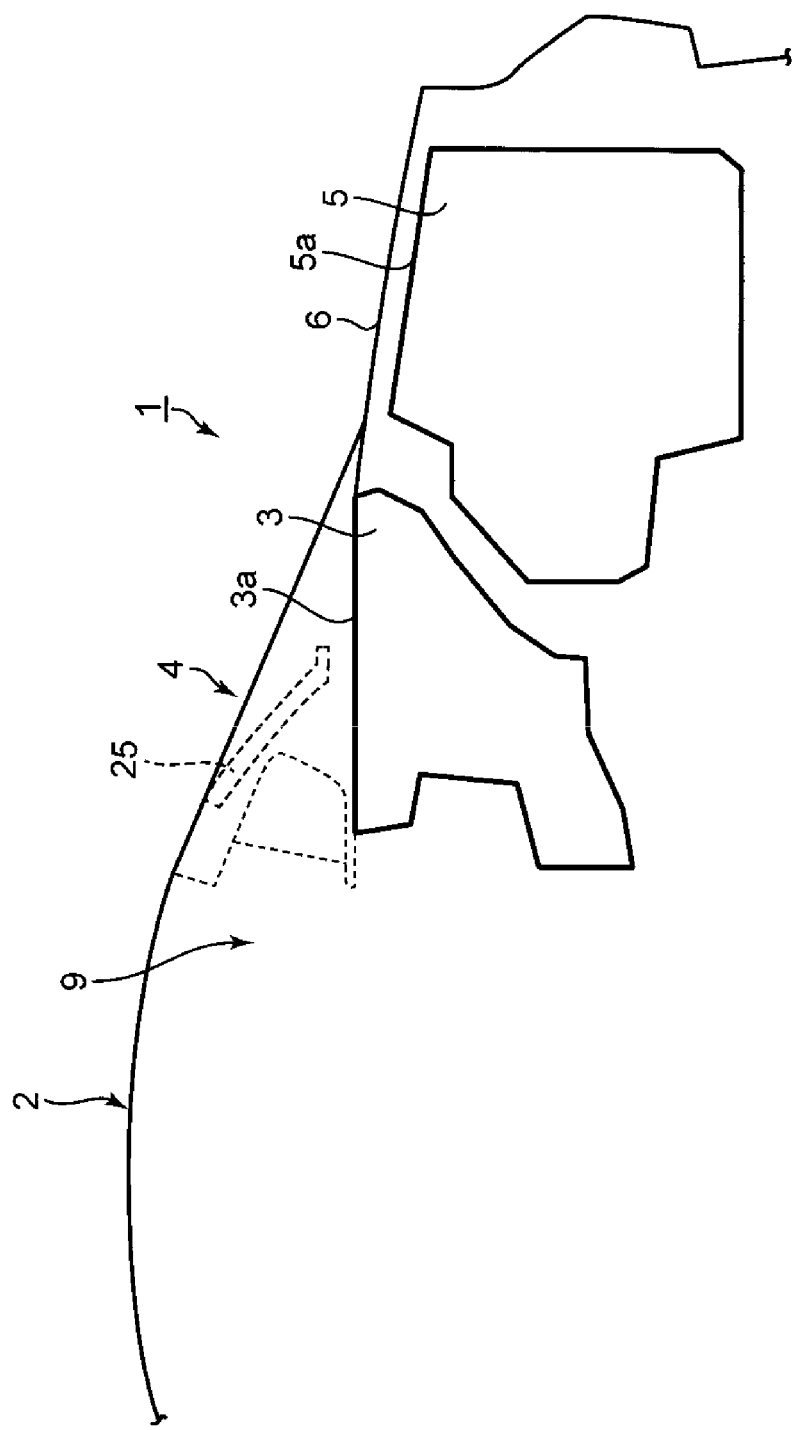
FIG. 8 is a diagram showing respective positions of storage room and a trunk room according to the embodiment of the present invention.

The deck lid 4 is openable and covers an opening portion 3a of the roof storage room 3 (see FIG. 8). The deck lid 4 comprises the base portion 41, a protrusion portion 42, the rear header 24, and a high-mount brake (stop) lamp 43 (see FIGS. 2 and 9).

Figure 9:
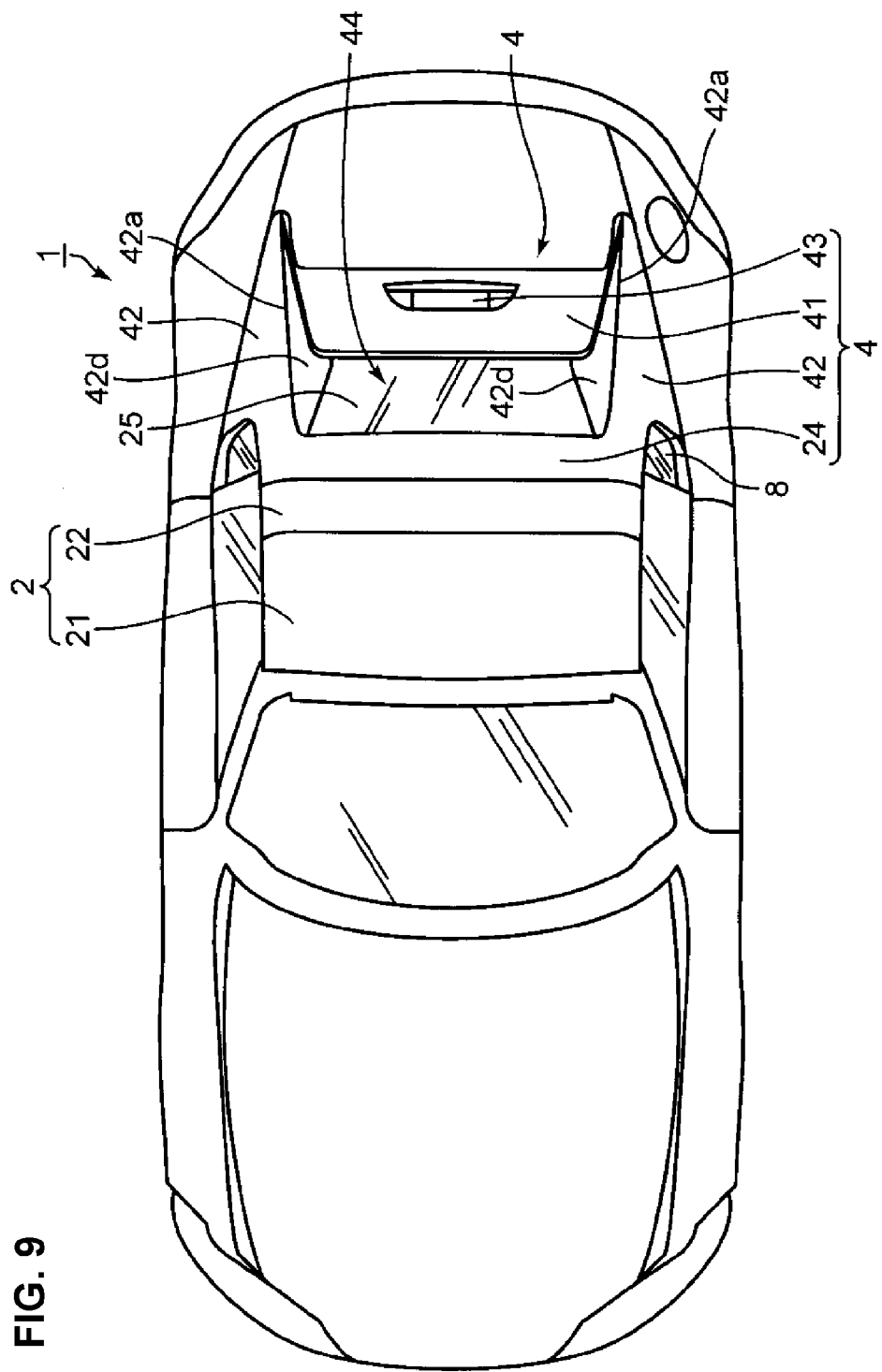
FIG. 9 is a plan view showing a whole part of the vehicle provided with the rear vehicle-body structure according to the embodiment of the present invention in the state in which the openable roof is closed.

The base portion 41 is a trapezoidal plate-shaped portion in the plan view, and its front portion is shorter than its rear portion in the vehicle width direction (see FIGS. 2 and 9). The high-mount brake lamp 43 is provided at an upper face of a central portion, in the vehicle width direction, of the base portion 41.

The protrusion portion 42 is formed integrally with a left end (one end in the vehicle width direction) and a right end (the other end in the vehicle width direction) of the base portion 41. The protrusion portion 42 protrudes upward relative to the base portion 41 and extends in the longitudinal direction.

The protrusion portion 42 is of a triangular shape when viewed from the vehicle side. That is, an upper edge 42a of the protrusion portion 42 slants rearward and downward and a lower end portion 42b of the protrusion portion 42 extends roughly horizontally, whereby the protrusion portion 42 is formed in a triangular shape in a side view. The upper edge 42a and the lower end portion 42b are respectively formed in a curve shape projecting upward. A cutout portion 42c is formed at a front-side portion of the above-described triangular portion (see FIG. 5), and a quarter window 8 is provided at the cutout portion 42c.

The cutout portion 42c is configured to extend to a position located rearward of an upper end portion of the back window 25 which slants rearward and downward in the roof closed state and the roof open state, when viewed from the vehicle side. An inclination of the upper edge portion 42a of the protrusion portion 42 is gentler than that of the back window 25 in the roof closed state. Thereby, a triangular wall portion which forms an inside side face, in the vehicle width direction, of the protrusion portion 42 (hereafter, referred to as a "vehicle-width-direction inside wall 42d") is formed in back of a side portion of the back window 25 (see FIGS. 2, 4, 7, 9 and 10). This vehicle-width-direction inside wall 42d is positioned between the high-mount brake lamp 43 and the cutout portion 42c.

A rear end portion of the protrusion portion 42 protrudes rearward from a rear end portion of the base portion 41 (see FIGS. 2 and 9). This rearward-protrusion portion is configured in a shape narrowing rearward such that its size in the vehicle width direction and its size in the vertical direction (i.e., its width and its height) thereof become smaller toward the vehicle rear side.

An upper end portion (an upper end portion of the upper edge 42a) of the protrusion portion 42 positioned at one end in the vehicle width direction (hereafter, referred to as "the left-side protrusion portion 42") and an upper end portion (an upper end portion of the upper edge 42a) of the protrusion portion 42 positioned at the other end (hereafter, referred to as "the right-side protrusion portion 42") are interconnected by the rear header 24. The left-side protrusion portion 42, the rear header 24, and the right-side protrusion portion 42 are formed integrally.

The left-side protrusion portion 42 serves as a left-side rear pillar, and the right-side protrusion portion 42 serves as a right-side rear pillar.

Herein, the rear header 24 may not be necessarily connected to the upper end portion as long as it is connected to a position of the protrusion portion 42 which is located above the lower end portion of the protrusion portion 42.

A rectangular-shaped area which is enclosed by the left-side protrusion portion 42, the right-side protrusion portion 42, the rear header 24, and the base portion 41 forms an opening portion 44 where the back window 25 is provided (see FIGS. 2 and 4).

Each of the left-side protrusion portion 42 and the right-side protrusion portion 42 is configured in the plan view such that it expands gradually inward in the vehicle width direction toward the opening portion 44 and the cutout portion 42c (see FIG. 9).

Figure 10:
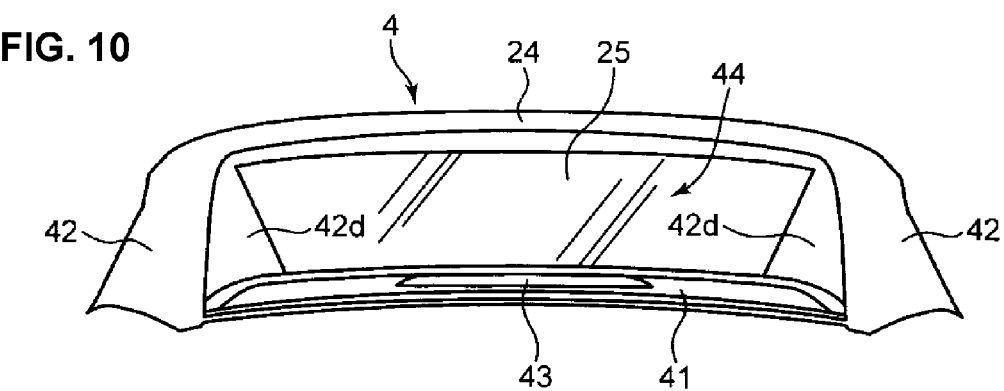
FIG. 10 is a back view of a deck lid and a back window.

Further, each of the left-side protrusion portion 42 and the right-side protrusion portion 42 is configured in the back view such that it expands gradually inward in the vehicle width direction beside the opening portion from its upper end portion to its lower end portion (see FIG. 10).

The first link mechanism 7 (see FIGS. 13 and 14) is provided inside the roof storage room 3 at each of the both end portions in the vehicle width direction (the left end portion and the right end portion). The first link mechanism 7 connects a bottom portion of the deck lid 4 and a side portion (a side wall, for example) of the roof storage room 3. The first link mechanism 7 supports a position near a front portion of the protrusion portion 42.

Figure 13:
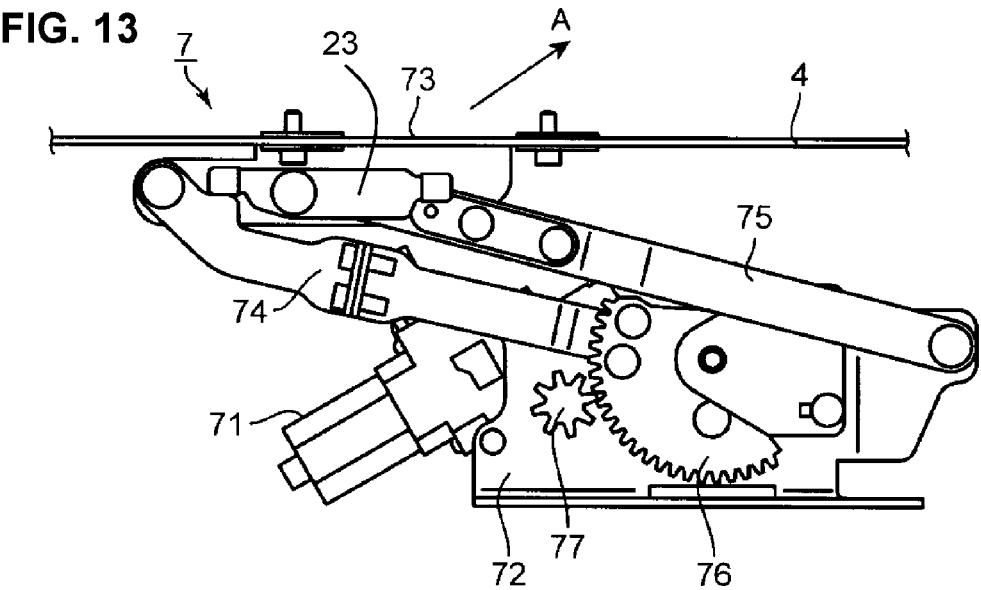
FIG. 13 is a diagram showing an example of a first link mechanism according to the embodiment of the present invention in the closed state and the open state of the openable roof.
Figure 14:
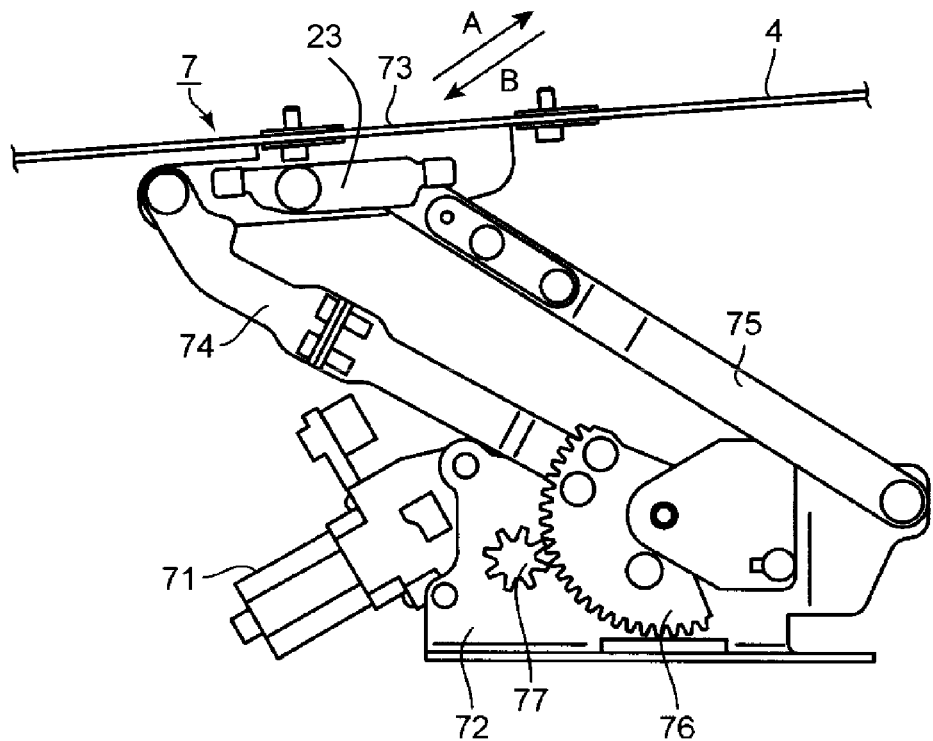
FIG. 14 is a diagram showing an example of the first link mechanism according to the embodiment of the present invention in the transitional state between the closed state and the open state of the openable roof.
Figure 15:
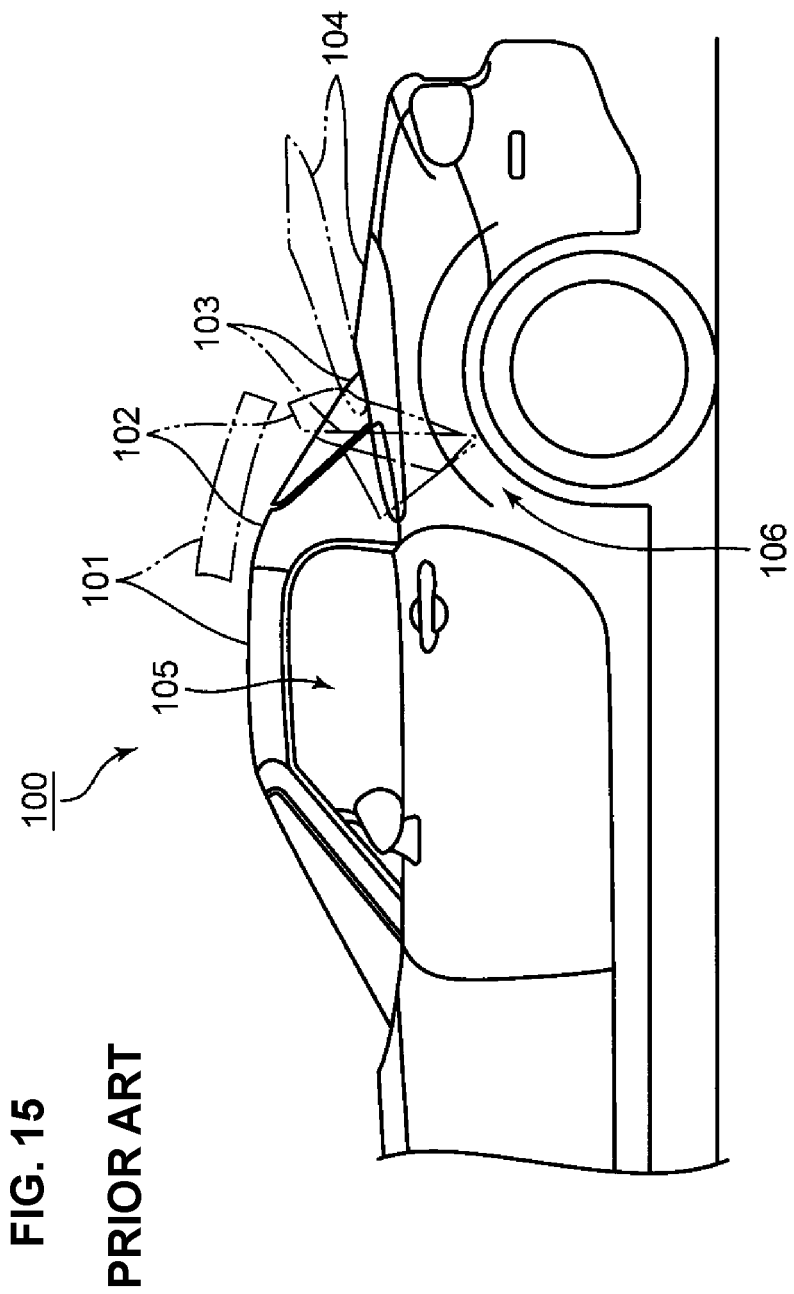
FIG. 15 is a side view of a (prior art) rear vehicle-body structure of a vehicle (the above-described patent document of Japanese Patent Laid-Open Publication No. 2007-261412), which shows a state in which a front roof panel, a middle roof panel, and a back window are located in a use position.
Figure 16:
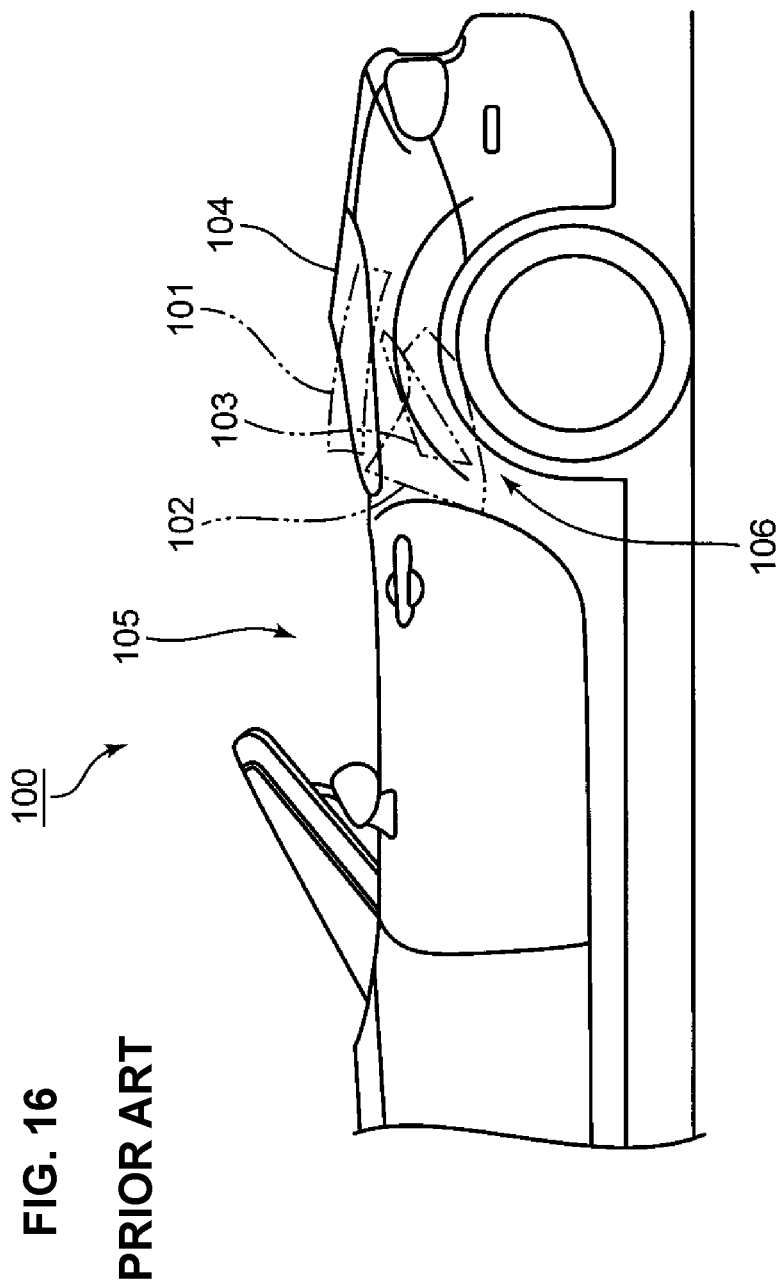
FIG. 16 is a side view of the above-described (prior art) rear vehicle-body structure of the vehicle, which shows a state in which the front roof panel, the middle roof panel, and the back window are located in a storage position.

The first link mechanism 7 is a mechanism to make the deck lid 4 swing by using a motor 71 as a driving source. The first link mechanism 7 is a quadric link mechanism. The first link mechanism 7 comprises, as shown in FIGS. 13 and 14, a main bracket 72 which is a base member, a lid bracket 73 which is fixed to the deck lid 4, a drive lever 74 which has both ends thereof which are respectively pivotally coupled to the main bracket 72 and the lid bracket 73 and drives the first link mechanism 7, and a driven lever 75 which has both ends thereof which are respectively pivotally coupled to the main bracket 72 and the lid bracket 73 and restricts a swinging range and a swinging move of the deck lid 4. The drive lever 74 and the driven lever 75 are arranged roughly in parallel to each other. The main bracket 72 is fixed to the side wall of the roof storage room 3, thereby fixed to the vehicle body.

A driving force of the motor 71 is transmitted to the drive lever 74 via a pinion 77 and a sector gear 76. When the motor 71 rotates in a forward direction from a state shown in FIG. 13, the drive lever 74 receives the driving force and rotate the drive lever 74 and the driven lever 75 so that these levers 74, 75 rise up, and the lid bracket 73 moves in an arrow A direction according to this rising move (see FIGS. 13 and 14). According to this move, the deck lid 4 which is fixed to the lid bracket 73 goes up, moving rearward, to a position where the deck lid 4 is located at an obliquely rearward-and-upward position relative to the opening portion 3a of the roof storage room 3. This move prevents the openable roof 2 and the back window 25 from interfering with the deck lid 4.

After the deck lid 4 is located at the obliquely rearward-and-upward position relative to the opening portion 3a, when the motor 71 rotates in a backward (reverse) direction, the drive lever 74 receives this rotational driving force and the drive and driven levers 74, 75 rotate so that these levers 74, 75 fall down. The lid bracket 73 moves in an arrow B direction according to this falling-down move (see FIG. 14). According to this move, the deck lid 4 which is fixed to the lid bracket 73 covers and close the opening portion 3a of the roof storage room 3.

The second link mechanism 10 (see FIGS. 3 and 4) is provided inside the roof storage room 3 at each of the both end portions (the left end portion and the right end portion) in the vehicle width direction. The left-side second link mechanism 10 connects respective left end portions of the front roof 21, the middle roof 22, and the back window 25 and a left-side side portion (a side wall, for example) of the roof storage room 3. Further, the right-side second link mechanism 10 connects respective right end portions of the front roof 21, the middle roof 22, and the back window 25 and a right-side side portion (a side wall, for example) of the roof storage room 3.

The second link mechanism 10 is driven by a motor, not illustrated. In a case in which the roof is changed to the roof open state from the roof closed state, the second link mechanism 10 operates to open the middle roof 22, the back window 25, and the front roof 21 by the motor's rotation in the forward direction after the deck lid 4 starts retreating to the position where the deck lid 4 does not interfere with the openable roof 2 and the back window 25 (see FIG. 3). Specifically, according to the operation of the second link mechanism 10 which is caused by the motor's rotation in the forward direction, the front roof 21 and the middle roof 22 of the openable roof 2 and the back window 25 are moved rearward rotationally and finally stored in the roof storage room 3 such that these members 22, 25, 21 are overlapped in order from below (see FIG. 5).

Figure 5:
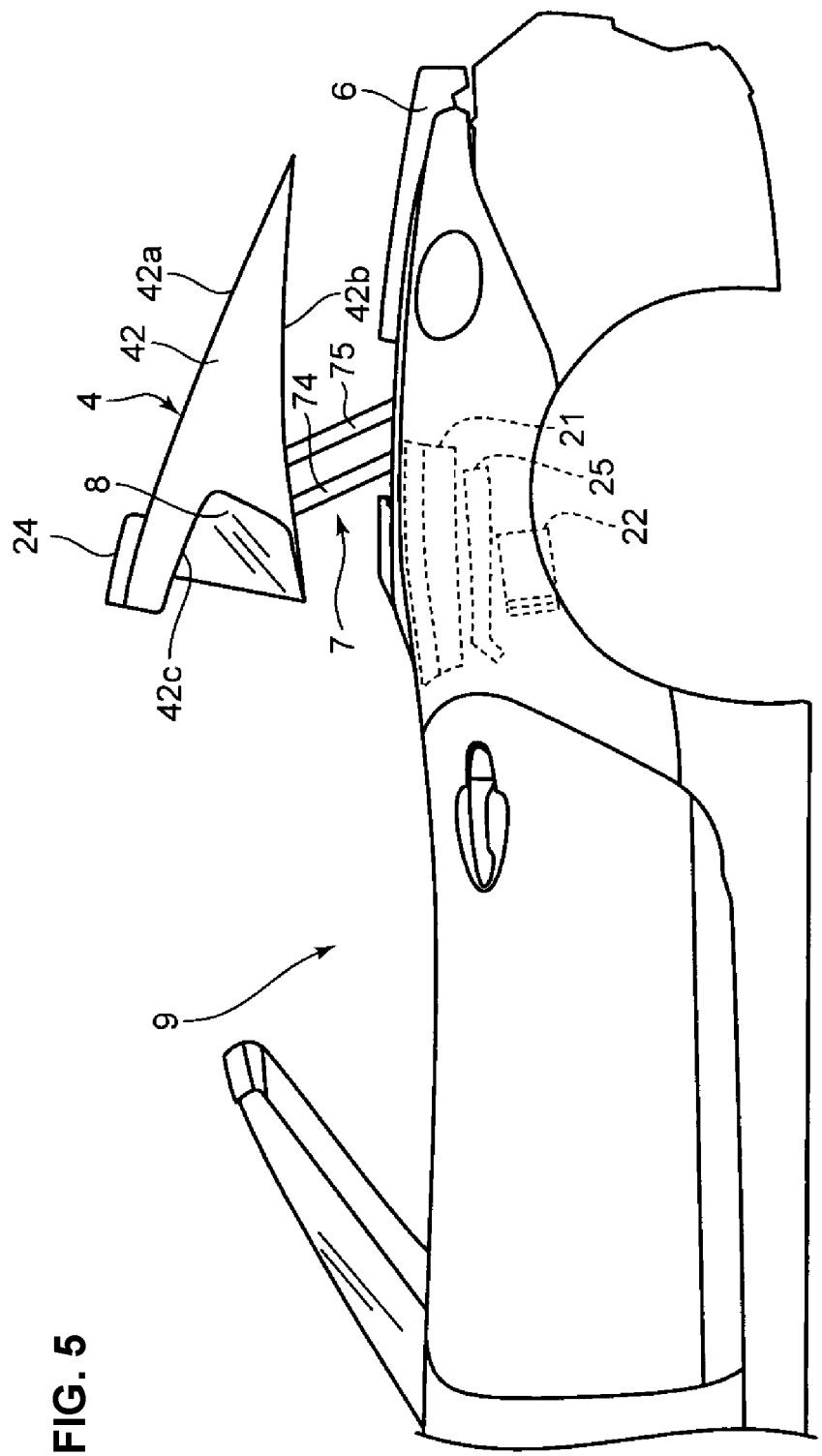
FIG. 5 is a side view showing the rear vehicle-body structure of the vehicle according to the embodiment of the present invention in a transitional state (after the roof is stored) from the state in which the openable roof is closed to the state in which the openable roof is open.

Meanwhile, in a case in which the roof is changed to the roof closed state from the roof open state, the second link mechanism 10 operates to close the middle roof 22, the back window 25, and the front roof 21 by the motor's rotation in the backward (reverse) direction after the deck lid 4 starts retreating to the position where the deck lid 4 does not interfere with the openable roof 2 and the back window 25 (see FIG. 5). Specifically, according to the operation of the second link mechanism 10 which is caused by the motor's rotation in the backward (reverse) direction, the front roof 21 and the middle roof 22 of the openable roof 2 and the back window 25 are moved forward rotationally and finally positioned in a state in which the front roof 21 and the middle roof 22 are continuous to each other and the back window 25 is spaced rearward apart from the rear end of the middle roof 22 (see FIG. 3). Herein, a separation distance of the back window 25 and the rear end of the middle roof 22 matches a length, in the vehicle longitudinal direction, of the rear header 24.

The trunk room 5 is provided behind the roof storage room 3 and below the trunk lid 6. The trunk room 5 is a partition to store baggage of the vehicle.

The trunk lid 6 covers an opening portion 5a (see FIG. 8) of the trunk room 5 so as to open or close the opening portion 5a. The trunk lid 6 is rotatably attached to the vehicle body via a hinge, not illustrated, at its front end portion.

Hereafter, operations of the openable roof 2 and the deck lid 4 will be described.

A changing operation of the openable roof 2 from the state (the roof closed state) in which the roof 2 covers over the passenger cabin 9 to the state (the roof open state) in which the roof 2 opens the passenger cabin 9 will be described.

The deck lid 4 covers the opening portion 3a in the state in which the openable roof 2 covers over the passenger cabin 9 as shown in FIGS. 1 and 2. In this state, the rear header 24 is provided to be continuous rearward from the middle roof 22, and the back window 25 is arranged at the opening portion 44 of the deck lid 4. A gap between a periphery of the opening portion 44 of the deck lid 4 and the peripheral portion of the back window 25 is sealed by a seal member S. Further, the drive lever 74 and the driven lever 75 are in a state in which these are fallen down in parallel to each other, and the first link mechanism 7 is folded (see FIG. 13).

When a user presses a roof-open button, not illustrated, which is provided near a driver's seat in the roof closed state, the motor 71 rotates in the forward direction, so that the drive lever 74 and the driven lever 75 of the first link mechanism 7 rise up (see FIG. 14). According to this rising move of the first link mechanism 7, the deck lid 4 is moved obliquely rearward and upward relative to the opening portion 3a (see FIGS. 3 and 4).

When the deck lid 4 is moved obliquely rearward and upward relative to the opening portion 3a, the rear header 24 gets separated from the middle roof 22, the back window 25 gets separated from the opening portion 44, and the deck lid 4 gets separated from the front roof 21, the middle roof 22, and the back window 25 (see FIGS. 3 and 4).

Next, the second link mechanism 10 which is coupled to the openable roof 2 is driven by the motor. According to the operation of the second link mechanism 10, the front roof 21 and the middle roof 22 of the openable roof 2 and the back window 25 rotate rearward such that the middle roof 22, the back window 25, and the front roof 21 are overlapped in order from below. These members 22, 25, 21 are stored in the roof storage room 3 in the overlapping state (see FIG. 5).

Next, the motor 71 rotates in the backward (reverse) direction, and the drive lever 74 and the driven lever 75 of first link mechanism 7 fall down (see FIG. 13). According to this falling-down move of the levers 74, 75, the deck lid 4 covers the opening portion 3a (closes the opening portion 3a) (see FIGS. 6 and 7). The drive lever 74 and the driven lever 75 are in the falling-down state in which these levers 74, 75 are arranged roughly in parallel to each other. Thus, the first link mechanism 7 returns to a folded state (see FIG. 13).

Herein, a changing operation of the roof from the roof open state to the roof closed state is done in an inverse order of the above-described changing operation (from the roof closed state to the roof open state). That is, the operation changes from the roof open state shown in FIGS. 6 and 7 to the state shown in FIG. 5, then to the state shown in FIGS. 3 and 4, and finally to the roof closed state shown in FIGS. 1 and 2.

As described above, according to the present embodiment, since the deck lid 4 includes the protrusion portion 42 extending in the vehicle longitudinal direction, the sporty external appearance can be created, thereby providing the rear portion of the vehicle body with a superior design. Further, since the rear header 24 and the protrusion portion 42 are not stored in the roof storage room 3, the members to be stored in the roof storage room 3 (the front roof 21, the middle roof 22, and the back window 25) can be compact as a whole, so that the area of the passing space of the members to be stored and the weight of the members to be stored can be properly small. In particular, the protrusion portion 42 serves as the rear pillar. Herein, while this rear pillar is generally configured to be wide in the vehicle width direction, the protrusion portion 42 serving as the rear pillar is not stored. Accordingly, the above-described compactness of the members to be stored as a whole in the vehicle width direction can be attained surely. The compact members to be stored can achieve the small-sized roof storage room 3 and an increase of the layout flexibility of vehicle components. Further, the small area of the passing space of the members to be stored can prevent the members to be stored from interfering with the opening portion 3a of the roof storage room 3 or the deck lid 4 which opens or closes the opening portion 3a of the roof storage room 3, thereby increasing the design flexibility of the members to be stored. Moreover, the small (light) weight of the members to be stored can cause an increase of the moving speed of the members to be stored, so that opening/closing behavior of the roof can be properly quick, thereby improving the operability of the openable roof by the vehicle user.

Further, in the transitional state between the roof closed state and the roof open state, the deck lid 4 is moved so as to open the opening portion 3a of the roof storage room 3. Since the rear header 24 and the protrusion portion 42 are configured as a portion (part) of the deck lid 4, it can be prevented that the openable roof 2 and the back window 25 interfere with the rear header 24 and the protrusion portion 42 during their moving. Moreover, since the swinging move of the deck lid 4 causes the rear header 24 and the protrusion portion 42 to swing, it is unnecessary to provide any other mechanism to make the rear header 24 and the protrusion portion 42 swing than the first link mechanism 7 to make the deck lid 4 swing.

Also, in the transitional state between the roof closed state and the roof open state, the deck lid 4 is moved so as to open the opening portion 3a of the roof storage room 3. Since the rear header 24 and the protrusion portion 42 are configured as a portion (part) of the deck lid 4, it can be prevented that the openable roof 2 and the back window 25 interfere with the rear header 24 and the protrusion portion 42 during their moving. Moreover, since the rear header 24 and the protrusion portion 42 are moved by the operation of the first link mechanism 7, it is unnecessary to provide any other moving mechanism to move the rear header 24 and the protrusion portion 42 than the first link mechanism 7.

Moreover, since the openable roof 2 and the back window 25 are moved after the rear header 24 and the protrusion portion 42 starts retreating to the position where the rear header 24 and the protrusion portion 42 do not interfere with the openable roof 2 and the back window 25, it can be prevented that the openable roof 2 and the back window 25 interfere with the rear header 24 and the protrusion portion 42, thereby improving the design flexibility of the openable roof 2, the back window 25, and the protrusion portion 42.

Further, since the deck lid 4 includes the protrusion portion 42 extending in the vehicle longitudinal direction, the sporty external appearance can be created, thereby providing the rear portion of the vehicle body with a superior design. Also, since the deck lid 4 is movable not only upward but rearward, the openable roof 2 can be properly stored, avoiding any interference of the openable roof 2 with the deck lid 4 when the openable roof 2 is moved from the closed state to the open state, even in case in which the upward movement amount of the deck lid 4 is relatively small. Moreover, since the above-described move of the deck lid 4 is performed by the rotation of the drive lever 74 and the driven lever 75 which connect the bottom portion of the deck lid 4 and the vehicle body, the structure of the first link mechanism 7 can be prevented from being complex. Accordingly, the roof opening/closing mechanism (the first link mechanism 7) can be small sized, thereby providing a superior layout of the vehicle components stored in the roof storage room 3. Also, since the roof storage room 3 can be compact, an open space can be created near the roof storage room 3, so that the layout flexibility of the vehicle components can be increased.

Also, since the protrusion portion 42 is configured in the triangular shape, when viewed from the vehicle side, such that the upper edge 42a slants rearward and downward, the rear portion of the vehicle body can be provided with a coupe-shaped design (an exterior design of a coupe type vehicle) in both the closed state and the open state of the openable roof 2. Further, the air resistance of the rear portion of the vehicle body can be reduced.

Moreover, since the first link mechanism 7 supports a position near a gravity center of the triangular-shaped protrusion portion 42, the deck lid 4 can be made to swing stably.

Further, since the rigidity of the deck lid 4 is increased by connecting the both-side protrusion portions 42 to each other in the vehicle width direction, a twist of the deck lid 4 during the deck lid 4 is moved can be prevented.

Also, since the seal member S to seal the peripheral portion of the back window 25 is provided at the back window 25, it is unnecessary to provide the seal member to seal the peripheral portion of the back window 25 at a vehicle-body member near a back face of a seat (a driver's seat and a passenger seat of a vehicle provided a single seat's row, or a rear seat in a rearmost seat's row of a vehicle provided with plural seat's rows). Accordingly, the peripheral portion of the back window 25 can be sealed, ensuring the design flexibility of the vehicle body near the seat's back face.

Moreover, since the first link mechanism 7 presses the deck lid 4 against the back window 25 in the roof closed state, the adhesiveness of the seal member S against the back window 25 and the deck lid 4 can be increased, thereby improving the seal efficiency.

Further, since the seal member S is provided over the whole part of the peripheral portion of the back window 25, the gap between the whole part of the peripheral portion of the back window 25 and the whole part of the peripheral portion of the opening portion 44 of the deck lid 4 can be sealed surely.

The present invention should not be limited to the above-described embodiment, and any other modifications or improvements may be applied within the scope of a spirit of the present invention.

For example, the first link mechanism 7 may be configured such that a portion of the link bracket 23 which is positioned on the side of the drive lever 74 is located at a higher level than a portion of the link bracket 23 which is positioned on the side of the driven lever 75 (the lid bracket 73 slants such its front portion is higher than its rear portion) when the both levers 74, 75 rise up. In this case, when the deck lid 4 goes up to the position located obliquely rearward and upward of the opening portion 3a, a distance between the portion of the deck lid 4 which is positioned on the side of the drive lever 74 is larger than that between the portion of the deck lid 4 which is positioned on the side of the driven lever 75, so that the openable roof 2 can be allowed to easily come in the opening portion 3a.

Further, instead of the above-described structure in which the openable roof 2 and the back window 25 are moved together by a pair of right-and-left second link mechanisms 10, these members 2, 25 may be configured to be moved separately by different link mechanisms from each other. Also, the front roof 21, the middle roof 22, and the back window 25 may be moved by different link mechanisms from each other.

While the protrusion portion 42 is provided at each end portion, in the vehicle width direction, of the deck lid 4 in the above-described embodiment (i.e., a pair of two protrusion portions 42), the present invention is not limited to this. For example, the single protrusion portion 42 may be provided at either one of the right-and-left end portions of the deck lid 4. In this case, any one of the right-and-left first link mechanisms 7 is configured to support the bottom portion of the protrusion portion 42, and the other is configured to support the base portion 41 of the deck lid 4. Further, three protrusion portions 42 may be provided respectively at the left-side end portion, a central portion, and the right-side end portion of the deck lid 4. In this case, the right-side protrusion portion 42 and the left-side protrusion portion 42 are supported only by the first link mechanisms 7.

Further, while the seal member S is provided at the peripheral portion of the back window 25 in the above-described embodiment, it may be provided at the peripheral portion of the opening portion 44 of the deck lid 4, for example. The design flexibility of the vehicle body near the seat's back face can be ensured in this case as well.

Also, while the seal member S is provided at the whole part of the peripheral portion of the back window 25 in the above-described embodiment, the present invention is not limited to this. For example, the openable roof is configured to comprise the front roof, the middle roof, the right-and-left rear pillars, and the rear header, and the deck lid is configured to comprise the base portion, but not comprise the protrusion portion and the rear header, which are not illustrated. Herein, there may be provided a seal member to seal a gap between the lower edge portion of the back window 25 and the base portion of the deck lid, a seal member to seal a gap between the upper edge portion of the back window 25 and the rear header, a seal member to seal a gap between the left edge portion of the back window 25 and the left-side rear pillar, and a seal member to seal a gap between the right edge portion of the back window 25 and the right-side rear pillar. The design flexibility of the vehicle body near the seat's back face can be ensured in this case as well.

What is claimed is:

1. A rear vehicle-body structure of a vehicle, comprising:
an openable roof capable of covering over a passenger cabin;
a back window provided in back of the openable roof to be apart from a rear end of the openable roof which is in a state in which the openable roof covers over the passenger cabin;
a link mechanism connecting the openable roof and the back window to a vehicle body such that the openable roof and the back window swing relative to the vehicle body;
a storage room provided in back of the passenger cabin to store the openable roof and the back window; and
a shielding member to shield a gap between the openable roof and the back window which are in a state in which the openable roof and the back window cover over the passenger cabin, wherein said shielding member is provided not to be storable in said storage room, and wherein there is provided a deck lid which is swingably supported so as to cover an opening portion of said storage room in a roof closed state in which said openable roof, said shielding member and said back window cover over the passenger cabin and in a roof open state in which the openable roof and the back window are stored in said storage room, and to open the opening portion of the storage room in a transitional state between the roof closed state and the roof open state, and said shielding member is formed as a portion of said deck lid.

2. A rear vehicle-body structure of a vehicle, comprising:
an openable roof capable of covering over a passenger cabin;
a storage room provided in back of the passenger cabin to store at least a portion of the openable roof;
a deck lid provided above said storage room and comprising a base portion and a protrusion portion which is integrally formed with the base portion, protrudes upward relative to the base portion, and extends in a vehicle longitudinal direction, a rear end of the protrusion portion being configured to protrude rearward from a rear end of the base portion; and
a lid link mechanism connecting the deck lid to a vehicle body such that the deck lid swings relative to the vehicle body,
wherein said deck lid is configured to cover an opening portion of said storage room in a roof closed state in which said openable roof covers over the passenger cabin and in a roof open state in which at least a portion of the openable roof is stored in the storage room, and to move obliquely rearward and upward relative to the opening portion of the storage room in a transitional state between the roof closed state and the roof open state, wherein the deck lid is substantially horizontal before, during and after the deck lid moves into the transitional state, and said lid link mechanism comprises a link lever which connects a bottom portion of said protrusion portion and the vehicle body, the link lever being configured to rotate upward when the deck lid goes up.

3. A rear vehicle-body structure of a vehicle, comprising:
an openable roof capable of covering over a passenger cabin;
a back window provided in back of the openable roof to be apart from a rear end of the openable roof which is in a state in which the openable roof covers over the passenger cabin;
a link mechanism connecting the openable roof and the back window to a vehicle body such that the openable roof and the back window swing relative to the vehicle body;
a storage room provided in back of the passenger cabin to store the openable roof and the back window; and
a shielding member to shield a gap between the openable roof and the back window which are in a state in which the openable roof and the back window cover over the passenger cabin,
wherein said shielding member is provided not to be storable in said storage room,
wherein said shielding member is configured to move to a transitional state between a roof closed state and a roof open state, and
wherein said shielding member forms part of an exterior of said vehicle in the roof closed state.

4. The rear vehicle-body structure of the vehicle of claim 3, wherein said shielding member comprises a rear header which shields a gap between the rear end of said openable roof and an upper end of said back window and a pair of right-and-left rear pillars which extend downward from both end portions, in a vehicle width direction, of said rear header.

5. The rear vehicle-body structure of the vehicle of claim 3, wherein there is provided a lid link mechanism for the shielding member which swingably connects the shielding member to the vehicle body, which is configured such that after the shielding member starts retreating to a position where the shielding member does not interfere with the openable roof and the back window by an operation of said lid link mechanism for the shielding member, the openable roof and the back window move by an operation of said lid link mechanism.

6. The rear vehicle-body structure of the vehicle of claim 3, further comprising:
a deck lid provided above said storage room and comprising a base portion and a protrusion portion which is integrally formed with the base portion, protrudes upward relative to the base portion, and extends in a vehicle longitudinal direction, a rear end of the protrusion portion being configured to protrude rearward from a rear end of the base portion; and
a lid link mechanism connecting the deck lid to the vehicle body such that the deck lid swings relative to the vehicle body,
wherein said deck lid is configured to cover an opening portion of said storage room in a roof closed state in which said openable roof covers over the passenger cabin and in a roof open state in which at least a portion of the openable roof is stored in the storage room, and to move rearward and upward relative to the opening portion of the storage room in a transitional state between the roof closed state and the roof open state, and said lid link mechanism comprises a link lever which connects a bottom portion of said protrusion portion and the vehicle body, the link lever being configured to rotate upward when the deck lid goes up.

7. The rear vehicle-body structure of the vehicle of claim 6, wherein said lid link mechanism supports a position near a front portion of said protrusion portion.

8. The rear vehicle-body structure of the vehicle of claim 6, wherein said protrusion portion is arranged at each end portion, in a vehicle width direction, of said base portion, wherein the protrusion portion positioned on one end side and the protrusion portion positioned on the other end side are interconnected, in the vehicle width direction, by said shielding member which is different from the base portion at respective positions of the both protrusion portions which are located above respective lower end portions of the both protrusion portions.

9. The rear vehicle-body structure of the vehicle of claim 6, wherein said protrusion portion is configured in a triangular shape, when viewed from a vehicle side, such that an upper edge thereof slants rearward and downward.

10. The rear vehicle-body structure of the vehicle of claim 3, further comprising:
a deck lid swingably supported so as to cover an opening portion of said storage room in a roof closed state in which said openable roof and said back window cover over the passenger cabin and in a roof open state in which the openable roof and the back window are stored in said storage room, and to open the opening portion of the storage room in a transitional state between the roof closed state and the roof open state; and a seal member provided at said back window or said deck lid to seal a gap between at least part of a peripheral portion of the back window and the deck lid in said roof closed state.

11. The rear vehicle-body structure of the vehicle of claim 10, further comprising a lid link mechanism for the deck lid to make said deck lid swing, wherein said lid link mechanism for the deck lid is configured to press the deck lid against said back window in said roof closed state.

12. The rear vehicle-body structure of the vehicle of claim 10, wherein in said roof closed state, said deck lid extends to a position above said back window, and said seal member is configured to seal a gap between at least a portion of an upper edge portion of the back window and the deck lid.

13. The rear vehicle-body structure of the vehicle of claim 12, wherein said seal member is configured to seal a gap between a whole part of the peripheral portion of the back window and the deck lid.

* * * * *